Figure 1:
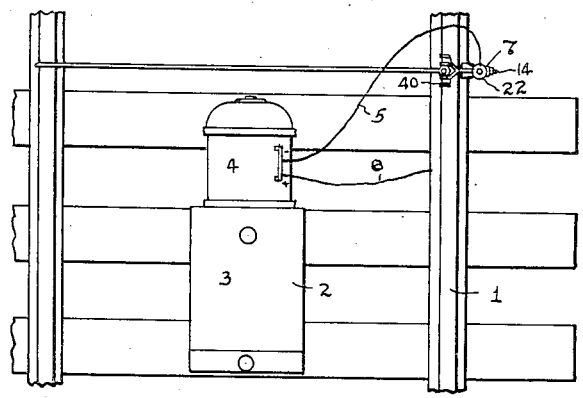

Nov. 6, 1934.  C. A. CADWELL  1,979,529
ELECTRIC METAL WORKING METHOD AND APPARATUS
Filed Feb. 18, 1932  2 Sheets-Sheet 1

INVENTOR.
Charles A. Cadwell
BY
Fay, Oberlin & Fay
ATTORNEYS

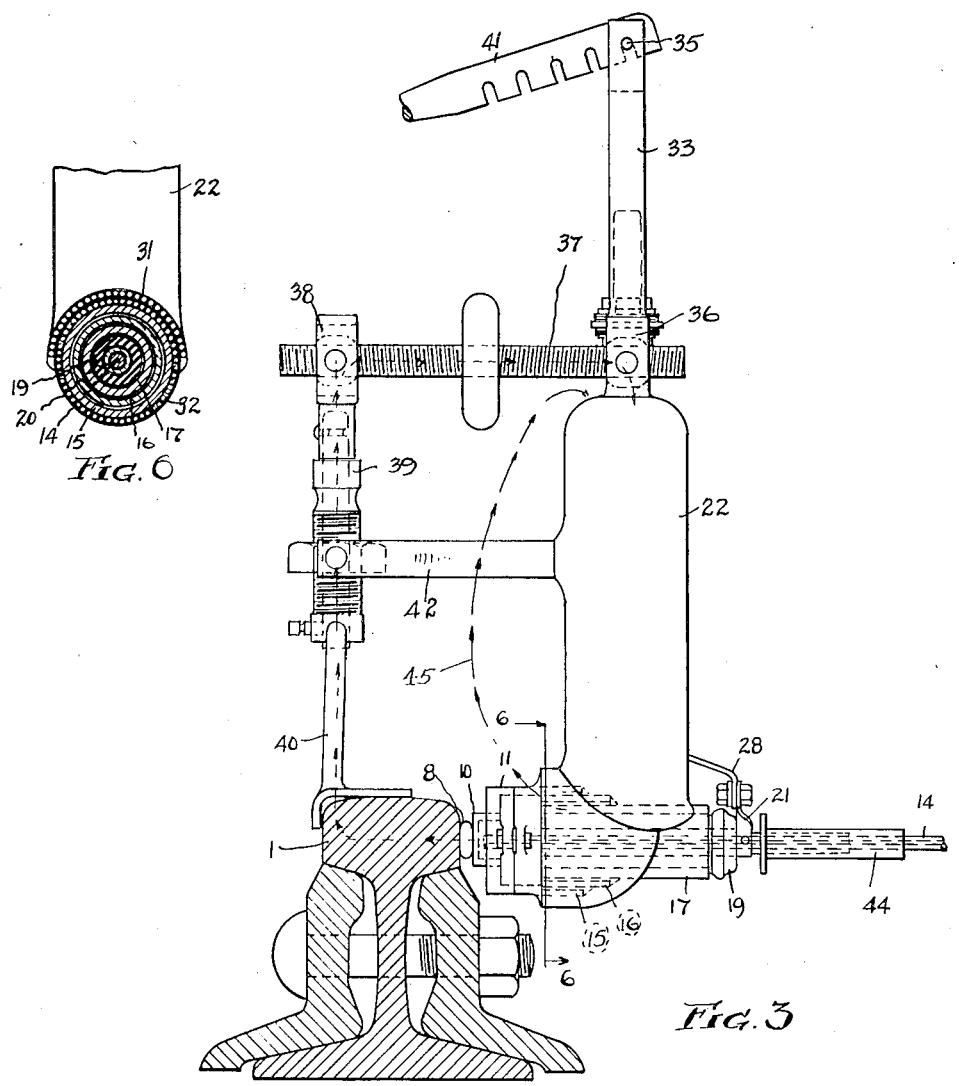

Patented Nov. 6, 1934

1,979,529

UNITED STATES PATENT OFFICE 1,979,529

ELECTRIC METAL WORKING METHOD AND APPARATUS

Charles A. Cadwell, Cleveland Heights, Ohio, assignor to The Electric Railway Improvement Company, Cleveland, Ohio, a corporation of Ohio Application February 18, 1932, Serial No. 593,827

15 Claims. (Cl. 219—11)

This invention relates as indicated to methods of and apparatus for metal working by electricity and has more specific reference to a method of and apparatus for applying copper bonds to steel rails.

The art of copper bonding steel rails in order to secure an uninterrupted flow of the electric current at a minimum resistance for which the rails usually constitute the return part of the circuit has been practiced since and with the first uses of electricity on transportation systems.

The art of electrically applying the copper bonds to the rails has reached its highest development on electric haulage lines using direct current for motive power, which current is also available for auxiliary purposes such as arc welding.

The bonding of the rails of steam roads where electric current is used only for the operation of automatic signals was, for a long time, accomplished by drill and plug methods only but the increasing use of gas welding and the demand for a more efficient type of bond has brought about the adoption of the small gas welded bonds in many cases on steam roads.

The steam road demand for welded bonds has become greater as long distance electrification has taken the place of steam power. The type of electrification employed, however, does not readily permit of the auxiliary use of the electric current of the road for such purposes as welding since high voltage alternating current not suitable for welding is generally used with such electrification.

The availability of power for the application of bonds to rails has been one of the greatest advantages of electric bonding methods, but the employment of other methods on roads where electric current is not available has served to call attention to the other advantage of the bond electrically applied to be found in the quality of the bond installed.

While electric welding units consisting of a gas engine and an electric generator are in common use, the size and weight of such a unit with a capacity large enough to weld, by methods heretofore employed, against the massive piece of welding work represented by the rail have prevailed against consideration of the use of such a unit for rail bonding, especially where the right of way on the rails is denied to such apparatus. The only basis for hope in realizing a small portable welding set independent of the rails for translation along the work is in the discovery of means and apparatus whereby the limited amount of heat energy to be derived from a relatively small portable energy unit can be utilized in an effective way.

As is well known to those familiar with the art, a rail bond is usually applied to a rail by forcing the bond against a portion of the rail by means of a pressure and heating block against the rear surface of which is directed an electric arc for the purpose of sufficiently heating the plate to braze the bond to the rail. It is essential that the apparatus employed for heating the pressure plate be effective to substantially uniformly heat a relatively large area of such plate so that the bond may be uniformly brazed to the rail.

As above indicated, the pressure plate is heated by an electric arc directed against the rear face thereof. The rays of any arc under direct current radiate from a crater at the positive pole in a comet-like stream towards the negative pole. If the negative pole be a flat surface like a heating plate, the positive crater of the arc being at the point of an electrode presented in arcing relation to the plate, the heating effect of the arc on the plate will be observed to be of fairly uniform intensity. If, however, the direction of current flow be reversed and the plate become positive, the arc craters at the plate and the heat is observed to be a spot of very high intensity surrounded by a zone of lesser intensity. On nearly all electric railways the overhead wire is positive and the rail is negative.

In a bonding apparatus, therefore, which utilizes power of the road, the heating plate pressed against the bond will be negative and the electrode presented in arcing relation thereto will be positive. This circumstance has heretofore been considered a fortunate one on account of the difficulties of doing practical bonding with the intense spot heat produced when the plate is positive and the electrode presented thereto is negative.

Even the relative uniformity of heat given by the arc on a negative plate was too small an area until magnetic means was discovered for spreading the arc and increasing this area. A certain position of the arc within a field of particular direction of magnetic lines produces a deflection and rotation of the arc rays around the axis of the electrode, the rotating arc assuming the position of the generating element of the frustum of a cone, the smaller base of which is the shifting crater of the arc on the point of the electrode and the larger base, the limits of a resulting enlarged zone of uniform heat intensity on the negative plate.

The smaller base of the cone frustrum representing the shifting of the crater on the positive electrode, in the case of a round electrode, is marked by a blunt or quick sharpening of the end of the electrode by the rotation of the arc rays as if produced by a revolving pencil sharpener.

If the direction of current flow be reversed, i. e., so that the plate is positive and the round electrode presented thereto is negative, the crater falls on the plate and does not shift at all, if the electrode be of solid cross-section. Changing the flow of current back again to its first direction and continuing the heat for a short interval of time, it is found that the larger base of the frustrum or the spread of heat on the negative plate increases with the temperature of the parts involved and has a tendency to go beyond bounds unless the direction and strength of the magnetic lines be such as not only to produce the rotation of the arc but to define and hold it within the desired limits.

As above pointed out, the heat at the positive electrode is greater than at the negative electrode. If, therefore, the direction of current flow in the welding circuit is such that the plate is positive and the electrode is negative, the greater heat generated in the plate makes possible the use of an appreciably smaller portable energy unit which is capable of easy translation along the work and does not require to be supported on a cumbersome carriage traveling on the rails of the right of way.

The fact that the quantity of heat at the negative pole of the arc is less than at the positive pole, is not important where power is cheap and is distributed by wire to the scene of operation. In cases, however, of the independent power unit operated by means of a gas engine, the economy to be derived, if possible, from the difference in heat between the two poles, affects the size of the power unit in a marked degree. Repeated attempts to reverse the polarity of the arc in the portable welder have heretofore brought only the result already mentioned, i. e., a spot of heat on the front plate of such destructive intensity that even the plate was burned through under the crater which would not shift or rotate under the influence of the magnetic field.

It is among the objects of my invention to provide a method of and apparatus of the character described in which the pressure plate is positive and the electrode presented thereto is negative, thereby making possible the use of a much smaller portable energy unit and the apparatus is constructed in such a manner as to effect a uniform heating of a relatively large area of such plate, thereby eliminating the intense spot heat usually occurring when the heating plate is positive.

The magnetic lines of a long solenoid with its axis coinciding with that of the arc and with the arc positioned at the parting of the lines at the end of the solenoid were first found to give the desired result of rotating the arc rays and yet to hold the rotation within bounds. This long solenoid was impractical, however, on account of space interference along the side of the rails and for other practical reasons. The solenoid was then shortened materially without altering the field, by introducing double cores in the construction of the solenoid, the effect of which was to straighten out the lines at the axis and around the arc. Several improvements along these and other lines have been made in the construction of the solenoid for generating the arc rotating and stabilizing magnetic field, without, however, the production of an apparatus which is not of considerable weight and proportions.

It is a further object of my invention to provide a form of construction of the arc stabilizing and rotating solenoid and associated mechanism which shall be capable of effectively controlling the arc and yet be of considerably smaller size and weight than any such apparatus heretofore constructed.

Other objects of my invention will appear as the description proceeds.

To the accomplishment of the foregoing and related ends, said invention, then consists of the means hereinafter fully described and particularly pointed out in the claims.

The annexed drawings and the following description set forth in detail certain means and one mode of carrying out the invention, such disclosed means and mode illustrating, however, but one of various ways in which the principle of the invention may be used.

Figure 2:
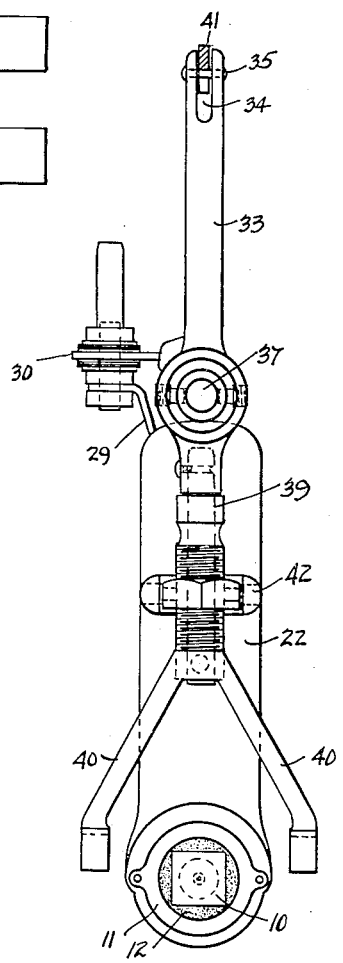
Figure 4:
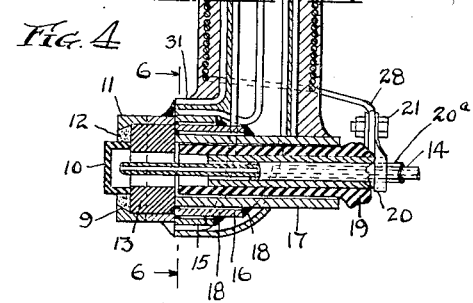

In said annexed drawings:

Fig. 1 is a plan view of a portion of a railroad right of way showing the apparatus comprising my invention positioned in operable relation thereon; Fig. 2 is a fragmentary elevational view of the rail bonding apparatus comprising my invention removed from the rail; Fig. 3 is a side elevational view of the apparatus illustrated in Fig. 2 positioned in operable relation on a rail; Fig. 4 is a part elevational, part sectional view of the apparatus illustrated in Fig. 3; Fig. 5 is a transverse sectional view of the apparatus illustrated in Fig. 4 taken on a plane substantially indicated by the line 5—5; and Fig. 6 is a transverse sectional view of a portion of the apparatus illustrated in Figs. 3 and 4 taken on a plane substantially indicated by the lines 6—6.

Referring now more specifically to the drawings and more especially to Fig. 1, the apparatus comprising my invention is herein illustrated positioned on a rail 1 which is one of the rails of a suitable road which is to be bonded by suitable copper bonds secured to the adjacent ends of successive rails. The portable energy unit, generally indicated at 2, consists of a gasoline motor 3 and an electric generator 4. Suitable leads such as 5 and 6 from opposite poles of the generator 4 are respectively connected to the apparatus comprising my invention, generally indicated at 7, and the rail 1.

Referring now more specifically to the construction of the apparatus for pressing the bond against the rail and for brazing the same thereto, such apparatus, as most clearly illustrated in Fig. 4, consists of a heating furnace, generally indicated at 9, comprising a graphite front plate 10, which is secured in a housing 11 by means of a refractory cement 12. Likewise positioned within the housing 11 is an apertured graphite block 13 which, along with the front plate 10, forms a substantially closed chamber, open at its rear end, for the insertion of an electrode 14 in arcing relation to the rear face of the plate 10.

The means for establishing a magnetic field coaxially about the arc for the purpose of rotating and directing the same against the front plate 10 consists of a plurality of coaxially arranged cores 15, 16 and 17, preferably formed of magnetic material and welded together in slightly spaced relation by deposits of non-magnetic material, such as copper, as indicated at 18. Secured within the inner core 17 is a tubular member 19 of insulating material which supports a copper tube 20 adapted to slidably support an electrode holder 20a which is tubular in form and provided with an insulated handle 44 by which the same may be grasped.

Arranged substantially radially with respect to the axis of the cores 15, 16 and 17 and the electrode 14 is an electro-magnet, generally indicated at 22, the construction of which is most clearly illustrated in Fig. 5. The magnetic core of the electro-magnet 22 consists of two groups of axially extending wires 23 and 24 separated by means of a non-magnetic tubular member 25. A layer of suitable insulating material 26 encompasses the magnetic core and likewise encloses a helical coil 27 which is the conductor for the arc current and which, at one end 28, is secured to the clamp 21 and at its other end 29, is secured to a binding post 30 to which the lead 5 from the generator 4 will be secured.

The wires forming the outer core 23 are, at their lower ends, directed radially with respect to the axis of the electro-magnet and substantially parallel with the axis of the electrode 14.

These ends 31 of the outer core 23 are, as most clearly illustrated in Figs. 4 and 6, arranged in a semi-circular band concentric with the axis of the electrode.

The wires forming the inner core 24 of the electro-magnet 22 are likewise bent radially with respect to the axis of the magnet and arranged in a circular band 32, as most clearly illustrated in Fig. 6, concentric with the axis of the electrode and preferably in magnetic communication with the shell or core 15.

In Fig. 4 only three of the wires of the inner core 24 are illustrated as representative of the manner in which such wires are, at their lower ends, arranged coaxially with the electrode 14.

Associated with the upper end of the electro-magnet 22 is a bracket extension 33 which is terminally bifurcated as at 34 and provided with a pin 35.

Oscillatably supported within the bracket 33 is a nut 36 in which is threaded one end of an adjusting screw 37 which, at its other end, is threaded in a nut 38, oscillatably supported in a bracket member 39. The bracket member 39 is, at its lower end, provided with spaced feet 40 adapted to engage the ball of the rail on which the apparatus is mounted. A steadying brace 41 extends from the opposite rail of the track and is engaged by the pin 35 in the upper end of the bracket 33 for maintaining the heating apparatus in proper position on the rail and in contact with the bond 8. A cross-brace member 42, which is preferably of non-magnetic material such as copper, is threadably engaged in a nut 43 secured to the outer core of the magnet. The other end of the brace 42 oscillatably engages a portion of the bracket 39. The above described means for supporting the heating apparatus on the rail and for manipulating the same and for pressing the end of the bond against the rail, softening the same by the heat of the engaging graphite plate, shaping the yielding metal into an efficient terminal and making brazed and welded contact with the metal of the rail is, so far as its construction and operation is concerned, substantially the same as is illustrated in my previous patents.

It should be noted at this point, however, that the bracket 39 including its feet 40 and the screw 37 are of magnetic material and the member 42 is of non-magnetic material. The supporting means for the electro-magnet on the rail, therefore, supplies a closed circuit for the flux of the electro-magnet to assist in directing the lines of flux substantially parallel to the axis of the arc so as to rotate the same and control the same in its blow against the inner surface of the plate 10.

The operation of the above described apparatus is briefly as follows:

The generator 4 will be suitably energized so as to make available the necessary heat energy to be utilized in the manner presently to be explained. The electrode 14 is manipulated by grasping the insulated handle 44 of its holder 20a. The electrode, before being inserted in the heating chamber, will first be soaked or dipped in water so as to supply a quantity of water to the heating chamber for the purpose of increasing the resistance of the arc. The electrode prepared in the above manner is introduced into the heating furnace until contact is made with the rear face of the front plate 10, whereupon the electrode will be withdrawn for a short distance to draw the heating arc of proper length. The electro-magnet being in series with the arc, is likewise energized as the arc is established.

The purpose of the multiple cores 15, 16 and 17 is to prevent a short circuit of the magnetic lines of flux generated by the magnet and to cause such lines to detour, passing the arc in a more nearly parallel direction and to follow the steel parts comprising the supporting means for the electro-magnet on the rail. Magnetic lines of like polarity repel each other so that if the magnetic lines of the outermost core 15 do not escape along the short circuit path, indicated by the arrows at 45 but are forced to flow through the steel parts 40, 39 and 37, the lines from the next inner core will choose a path further out from the path of the first core and so on until the lines from the heavy innermost core will follow the detour through the rail 1, the bracket 40, etc. above mentioned. The different cores are magnetically detached from each other in the manner above described in order to secure an independent discharge from each. The copper bore tube 20, which is in electrical communication with the lead for the arc current is carefully aligned and its alignment determines the axis of the arc within the heating furnace. By the employment of the herein described construction of electro-magnet and associated concentric cores of magnetic material, and effective magnetic field may be maintained in proper alignment about the axis of the heating arc for the purpose of rotating and directing the same against the inner face of the front plate. This construction enables me to generate a sufficiently strong and well directed field without the employment of a long solenoid coaxial with the arc or other cumbersome means heretofore employed for producing this magnetic field.

As most clearly illustrated in Fig. 4, the electrode 14 is tubular in form and as illustrated in Fig. 1, the positive lead from the generator 4 will be secured to the rail 1 and the negative lead will be secured to the binding post so that the front plate 10 will be positive and the electrode 14 will be negative. If the electrode 14 were of solid cross-section, the arc would crater on the front plate to produce a relatively small spot of intense heat, which would not only burn through the front plate but which would also be so localized as not to heat the entire area of the plate in contact with the bond. By having the electrode 14 hollow, the thread of the arc is caused to rotate around the annular wall of the electrode under the influence of the magnetic field and thereby a sufficient spread of the arc over the front plate is effected so that such front plate will be heated uniformly which is not the case when a solid electrode is employed, when the plate is positive and the electrode is negative.

Due to the fact that an efficient distribution of the arc over the plate is obtained by the use of a hollow electrode, when the plate is positive and the electrode negative, enables me to utilize on the heating plate the higher temperature generated at the positive pole of the arc and thereby makes possible the carrying forth of the heating or brazing operation with a portable energy unit much smaller in size than has heretofore been possible.

Other advantages incidental to the employment of the apparatus comprising my invention and the method adapted to be carried forth thereby are believed to be so apparent to those familiar with the art that a further enumeration thereof will not be necessary.

Other modes of applying the principle of my invention may be employed instead of the one explained, change being made as regards the means and the steps herein disclosed, provided those stated by any of the following claims or their equivalent be employed.

I therefore particularly point out and distinctly claim as my invention:

1. The method of heating by electricity comprising maintaining an electric arc between a hollow negative electrode and the article to be heated comprising the positive electrode, and laterally enclosing the arc in a magnetic field in which the lines of flux are substantially parallel to the axis of the arc.

2. In apparatus of the character described, the combination with an electrode adapted for presentation in arcing relation to material to be heated, of a plurality of coaxially arranged cores of magnetic material positioned around said electrode and an electro-magnet adjacent said cores, said cores magnetically insulated from each other and respectively connected by magnetic means to the core of said electro-magnet whereby to divide into parallel bands around the arc the flux flow of said electro-magnet.

3. In apparatus of the character described, the combination with an electrode adapted for presentation in arcing relation to material to be heated, of a plurality of coaxially arranged cores of magnetic material positioned around said electrode and an electro-magnet adjacent said cores and arranged substantially radially with respect to the axis of said electrode, said cores magnetically insulated from each other and respectively connected by magnetic means to the core of said electro-magnet whereby to divide into parallel bands around the arc the flux flow of said electro-magnet.

4. In apparatus of the character described, the combination with an electrode adapted for presentation in arcing relation to material to be heated, of a plurality of coaxially arranged cores of magnetic material positioned around said electrode and an electro-magnet arranged radially with respect to the axis of said electrode and having its core in magnetic communication with said coaxially arranged cores.

5. In apparatus of the character described, the combination with an electrode adapted for presentation in arcing relation to material to be heated, of a plurality of coaxially arranged cores of magnetic material positioned around said electrode, a core of magnetic material associated with said coaxially arranged cores in magnetic communication with and extending radially therefrom, and a conductor for the arc current wound on said radially extending core.

6. In apparatus of the character described, the combination with an electrode adapted for presentation in arcing relation to material to be heated, of a plurality of coaxially arranged cores of magnetic material positioned around said electrode and an electro-magnet adjacent said cores and provided with a plurality of magnetic cores respectively terminally associated with said coaxially arranged cores.

7. In apparatus of the character described, the combination with an electrode adapted for presentation in arcing relation to material to be heated, of a plurality of coaxially arranged cores of magnetic material positioned around said electrode and an electro-magnet position radially with respect to the axis of said electrode and provided with a magnetic core consisting of a plurality of wires separated into coaxial groups and such groups respectively terminally arranged concentric with the axis of said electrode and magnetically connected to said cores.

8. In apparatus of the character described, the combination of a heating furnace having a front plate for engagement with a bond to press the same against a rail, an electrode adapted for presentation in arcing relation to the back of said plate, an electro-magnet, a core of magnetic material within said electro-magnet and having one end arranged annularly about said electrode, and bracket means of magnetic material supporting said apparatus on the rail and connected with the other end of said core thereby providing a substantially closed path for the flux of said electro-magnet.

9. In apparatus of the character described, the combination with an electrode adapted for presentation in arcing relation to the material to be heated, said electrode at its arcing end being annular in cross-section, of means adapted to maintain a field of magnetic flux about said electrode, and of a plurality of co-axially arranged cores of magnetic material positioned around said electrode, whereby the lines of force in said field are concentrated.

10. In apparatus of the character described, the combination with an electrode having a terminus of annular cross-section adapted for presentation in arcing relation to the material to be heated, of a plurality of co-axially arranged cores of magnetic material positioned around said electrode, and an electro-magnet having an extended core element projected into parallel lapping relation with said co-axially arranged cores.

11. In apparatus of the character described, the combination with an electrode adapted for presentation in arcing relation to the material to be heated, of means to establish a field of magnetic flux co-axial with said electrode and a plurality of magnetic elements magnetically insulated establishing paths between the ends of said field.

12. In apparatus of the character described, the combination with an electrode having a terminal of annular cross-section adapted for presentation in arcing relation to the material to be heated, of a plurality of co-axially arranged cores of magnetic material positioned around said electrode, means to excite fields of magnetic flux co-axial with said electrode, and magnetic elements establishing a path between the ends of said fields.

13. In the method of heating metallic material by means of an electric arc between said material and a negative electrode having an annular cross-section, the steps which comprise striking said arc and maintaining thereabout a plurality of fields of magnetic flux substantially coaxial therewith.

14. In the method of heating by electricity in which a negative electrode of annular cross-section is presented in arcing relation to a positive electrode having a flat surface, the steps which comprise striking an arc between said electrodes and maintaining about said arc a plurality of fields of magnetic flux in substantially co-axial relationship with said negative electrode.

15. In the method of heating by electricity in which a negative electrode of annular terminal cross-section is presented in arcing relation to a positive electrode having a flat surface, the steps which comprise striking an arc between said electrodes, maintaining about said negative electrode a field of magnetic flux, and establishing therein areas of concentration of the lines of force of said field cylindrical in form substantially co-axial with said electrode.

CHARLES A. CADWELL.